Figure 1:
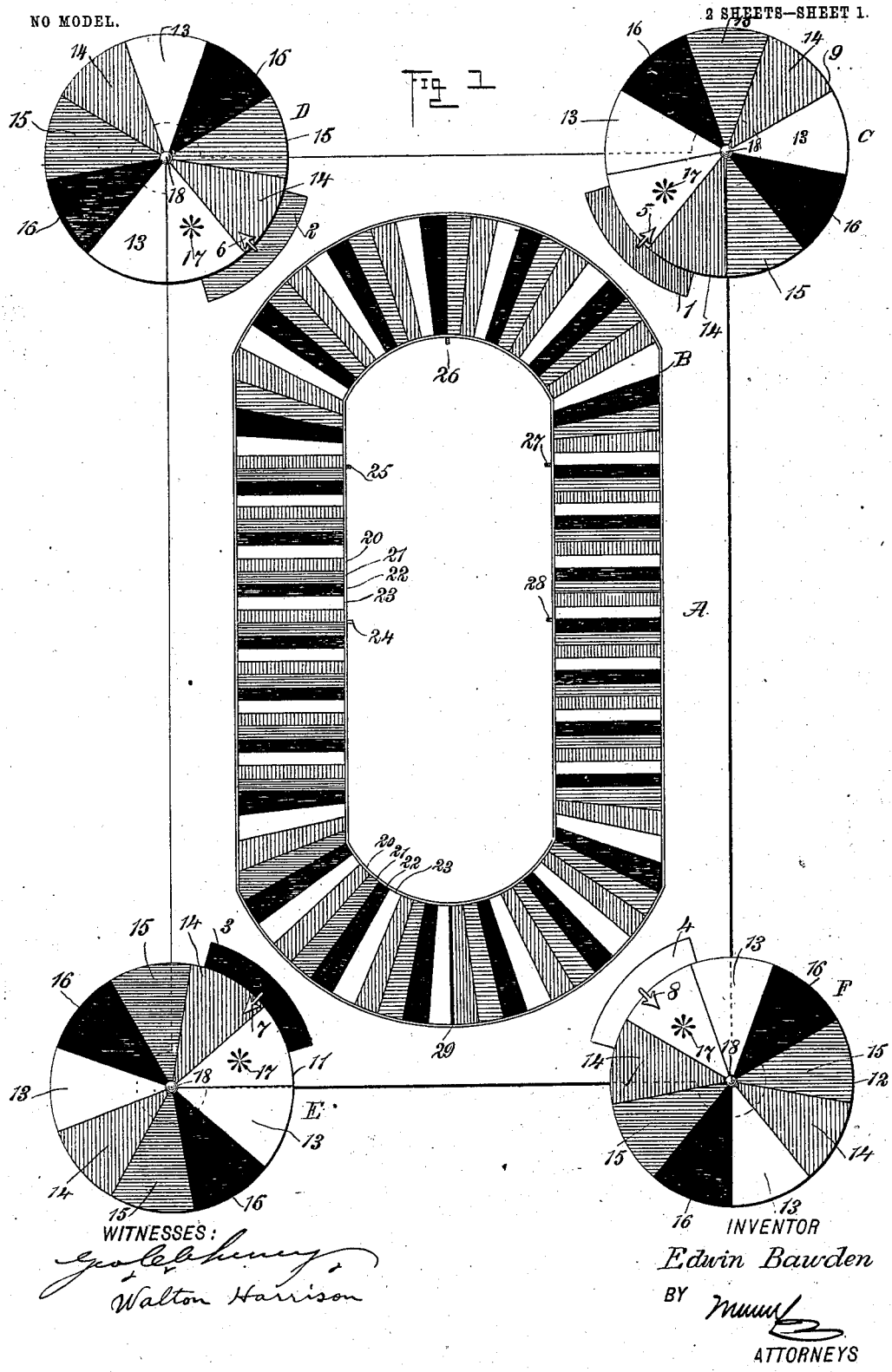

No. 724,244. PATENTED MAR. 31, 1903.
E. BAWDEN.
GAME APPARATUS.
APPLICATION FILED OCT. 1, 1901.
NO MODEL. 2 SHEETS—SHEET 1.

WITNESSES:
Geo. C. Henry
Walton Harrison

INVENTOR
Edwin Bawden
BY
ATTORNEYS

No. 724,244. PATENTED MAR. 31, 1903.
E. BAWDEN.
GAME APPARATUS.
APPLICATION FILED OCT. 1, 1901.
NO MODEL. 2 SHEETS—SHEET 2.
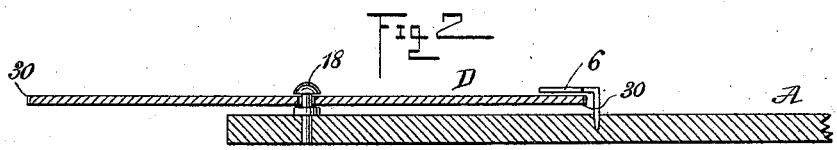
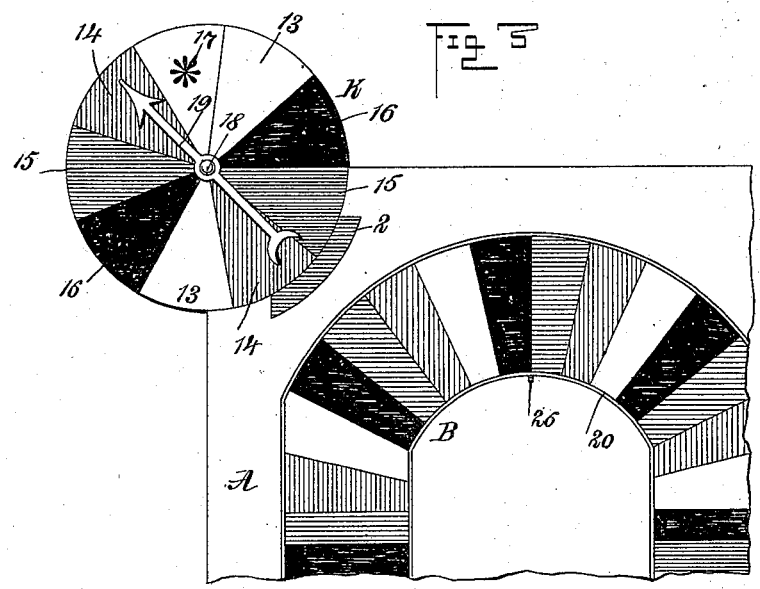
WITNESSES:
INVENTOR
Edwin Bawden
BY
ATTORNEYS

UNITED STATES PATENT OFFICE.

EDWIN BAWDEN, OF NEW YORK, N. Y.

GAME APPARATUS.

SPECIFICATION forming part of Letters Patent No. 724,244, dated March 31, 1903.

Application filed October 1, 1901. Serial No. 77,185. (No model.)

*To all whom it may concern:*

Be it known that I, EDWIN BAWDEN, a citizen of the United States, and a resident of the city of New York, borough of Manhattan, in the county and State of New York, have invented a new and Improved Game Apparatus, of which the following is a full, clear, and exact description.

My invention relates to a parlor game apparatus.

It consists, primarily, of a rectangular board the corners of which are provided with roulette-wheels and the center of which is provided with an endless elliptical track for indicating the scores made by the several players.

My invention will be fully described hereinafter and the features of novelty pointed out in the appended claim.

Reference is to be had to the accompanying drawings, forming a part of this specification, in which similar characters of reference indicate corresponding parts in all the views.

Figure 1 is a plan view of my improved board ready for use. Fig. 2 is a sectional view showing details of one of the corners of the board having the roulette-wheel connected therewith, and Fig. 3 is a fragmentary detail showing a slight modification in the form of the roulette-wheel.

The rectangular board is shown at A, the endless track at B, and the roulette-wheels at C, D, E, and F, and the modified form of the roulette-wheel at K. The game can be played by two, three, four, or perhaps other numbers of players. It can be played by individuals or by partners. It preferably represents a race and may be accompanied by forfeitures, penalties, &c., when desired. The players occupy respective stations around the board, the station of each player relatively to the board being indicated by the color-marks 1, 2, 3, and 4. In the form shown in Fig. 1 fixed pointers 5, 6, 7, and 8 are arranged, preferably in the position shown, for accurately locating the positions at which the roulette-wheels may happen to stop rotating. The roulette-wheels comprise disks 9 10 11 12, revolubly mounted upon pins 18 and preferably provided with milled edges 30 for facilitating the rotation of the said disks by the fingers. Each disk is provided with four colors, 13 14 15 16, which are duplicated upon each disk and also with a blank space provided with a star 17, which is used as a forfeiture-mark—that is to say, when one of the wheels is rotated by a player the pointer may stop on any one of the four colors or it may stop on the forfeiture-mark. In the modified roulette-wheel shown in Fig. 3 the disk is stationary and the revoluble pointer 19 is pivoted upon the pin 18 and is whirled by the fingers. The endless track B is made up of an endless series of different colors 20 21 22 23, arranged in rotation, as shown in Fig. 1, the colors having the same order as the colors upon the roulette-wheels. Stationary indicating-marks 24 25 26 27 28 are provided for the purpose of subdividing the track into fractional parts. The starting-point is indicated by the black line 29.

My game apparatus can be used in a variety of ways, among which are the following: Counters or game-pieces representing the different players can all be placed upon the common starting-line 29. The different players take their stations at the different corners of the board and each actuates his roulette-wheel and the pointer thereof. The wheel stopping upon a particular color indicates whether the player is to move his game-piece or not. The player moves his game-piece only when his wheel points out his color. In this way the several game-pieces moved by the several players will move at differential rates around the board and can pass each other, as would be the case in a race of any kind. If one of the roulette-wheels chances to indicate the forfeiture-space, however, the player will be required to forfeit some article, or his game-piece can be set back upon the board a definite distance, according to any method preferred.

The game may be played either as a so-called "straight" game, the race being once around the board and being competitive between individual players, or it may be a so-called "pursuit" game, for which the fractional subdivisions are provided. The oval track may consist of one hundred and eight color spots or any other number, but is preferably some number divisible by the number of players which it is desired shall engage in the game. In the form shown in Fig. 1 the number of spots in the track is one hundred and eight, this number being divisible by two, three, or four, so that all players will have even chances and equal distances to travel.

It will be understood I do not limit myself to a board in which the wheels are located at the corners. The wheels may be located at other points. Neither do I limit myself to colors, as any other distinguishing marks may be used.

The several players are of course provided with game-pieces of colors corresponding to the colors 1, 2, 3, and 4 shown at the corners of the board.

Having thus described my invention, I claim as new and desire to secure by Letters Patent—

A game apparatus, comprising a board provided with fixed color-marks for designating the positions of the different players, independent roulette-wheels disposed adjacent to said color-marks for the individual use of the different players, said roulette-wheels being provided with chance-controlled color-marks representing the colors of all the players collectively, and also provided with a chance-controlled mark for indicating a forfeiture, an endless track provided with colors corresponding to the colors used for designating the positions of the players arranged in rotation, and marks disposed periodically along said track indicating arbitrary subdivisions thereof.

In witness whereof I have signed my name to this specification in the presence of two subscribing witnesses.

EDWIN BAWDEN.

Witnesses:
 BENJ. BAKER,
 LOUIS MARAZITZ.